(12) United States Patent
Shioji et al.

(10) Patent No.: US 8,468,906 B2
(45) Date of Patent: Jun. 25, 2013

(54) GEARSHIFT KNOB ATTACHING STRUCTURE FOR VEHICLE GEARSHIFT LEVER UNIT

(75) Inventors: Norihito Shioji, Kosai (JP); Naoki Hagino, Toyohashi (JP)

(73) Assignee: Fuji Kiko Co., Ltd., Kosai-shi, Shizuoka-ken (JP)

( * ) Notice: Subject to any disclaimer, the term of this patent is extended or adjusted under 35 U.S.C. 154(b) by 245 days.

(21) Appl. No.: 13/172,246

(22) Filed: Jun. 29, 2011

(65) Prior Publication Data
US 2012/0000311 A1 Jan. 5, 2012

(30) Foreign Application Priority Data
Jun. 30, 2010 (JP) ............................... P2010-148987

(51) Int. Cl.
*F16H 59/04* (2006.01)
(52) U.S. Cl.
USPC ..................................... 74/473.3; 74/473.1
(58) Field of Classification Search
USPC ................. 74/473.1, 473.12, 473.15, 473.24, 74/473.25, 473.3
See application file for complete search history.

(56) References Cited

U.S. PATENT DOCUMENTS

| | | | | |
|---|---|---|---|---|
| 5,617,760 A * | 4/1997 | Woeste et al. | | 74/473.23 |
| 6,601,469 B1 * | 8/2003 | Giefer et al. | | 74/537 |
| 6,732,608 B2 * | 5/2004 | Suzuki | | 74/473.3 |
| 7,430,940 B2 * | 10/2008 | Kondou et al. | | 74/537 |
| 2006/0230858 A1 * | 10/2006 | Kurogane | | 74/473.1 |

FOREIGN PATENT DOCUMENTS

JP 2005-001470 A 1/2005

* cited by examiner

*Primary Examiner* — Justin Krause
(74) *Attorney, Agent, or Firm* — Nath, Goldberg & Meyer; Jerald L. Meyer

(57) ABSTRACT

When an end portion of a gearshift lever 20 is pressed into an inner insertion hole of a gearshift knob 23, an auxiliary lever 34 is brought into contact with the end of an operation member. Thereby, a link body 33 turns, and an end of a link lever 35 is inserted into a connection hole 24. In addition, when the end portion of the gearshift lever 20 is pressed into the inner insertion hole of the gearshift knob 23, the link lever 35 is guided by a guidance wall 24a to a deep portion of the connection hole 24. Thereby, the link body 33 turns, and the auxiliary lever 34 is separated from the end of the operation member 22. Furthermore, while the knob button 27 is being pressed down, the auxiliary lever 34 is always separated from the end of the operation member 22.

6 Claims, 8 Drawing Sheets

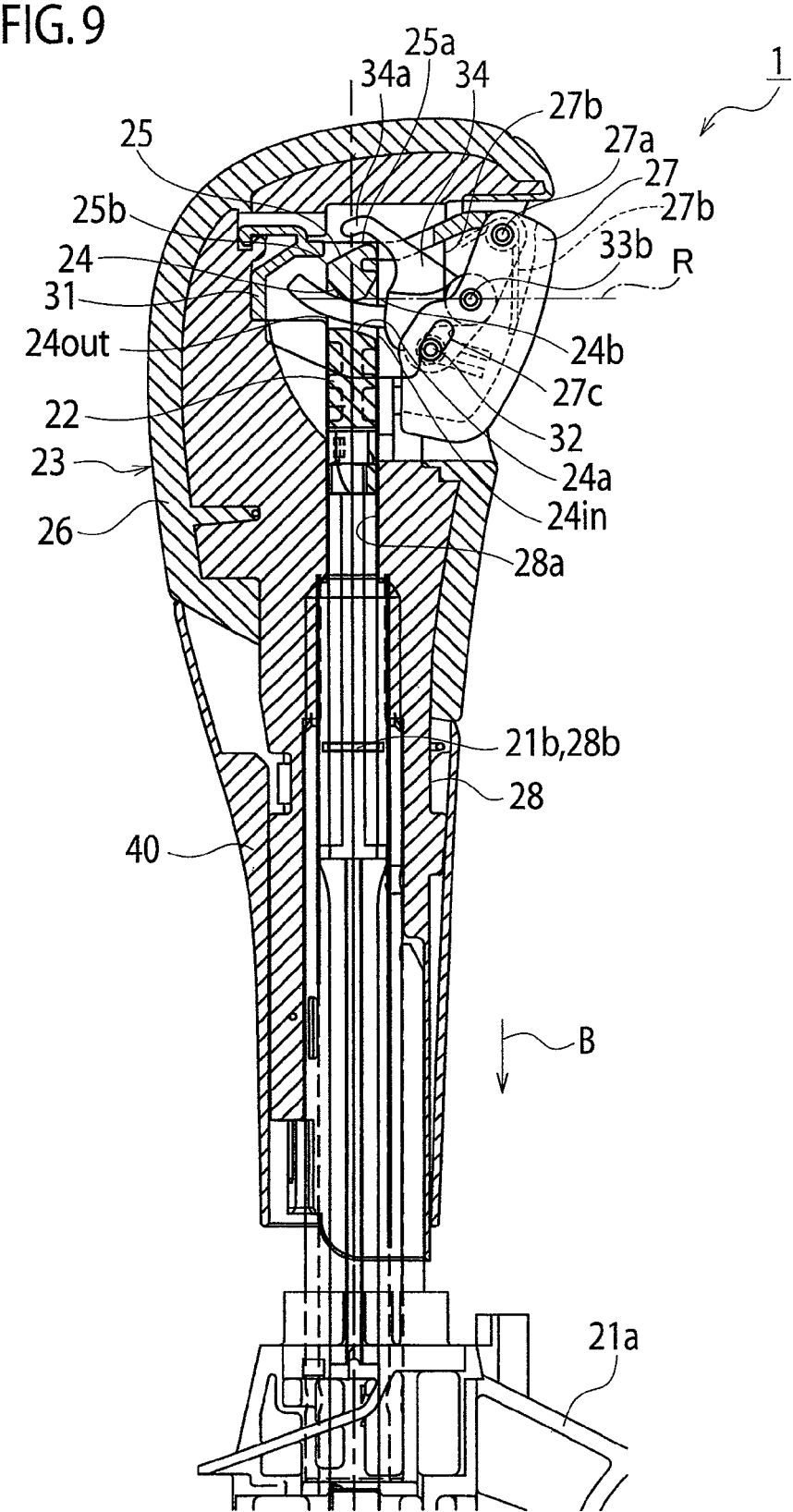

GEARSHIFT KNOB ATTACHING STRUCTURE FOR VEHICLE GEARSHIFT LEVER UNIT

TECHNICAL FIELD

The present invention relates to a structure configured to attach a gearshift knob of a vehicle gearshift lever unit to an end of a gearshift lever.

RELATED ART

For a conventional vehicle gearshift lever unit of this kind, as shown in FIGS. 1 and 2, improvement in work efficiency is pursued by simplifying a step of attaching the gearshift knob to the end of the gearshift lever. In a gearshift lever unit 101 disclosed in Patent Literature 1, a base end side of a gearshift lever 120 is swingably supported, and a gearshift knob 123 is placed on a top end side of the gearshift lever 120. The gearshift lever 120 is shaped like a cylinder, and a pull rod 122 is fittingly inserted in the inside of the gearshift lever 120 in a way to be movable in the axial direction. In general, the pull rod 122 is held while biased toward the base end; the rod base end portion (not illustrated) engages with a detent mount (not illustrated); and the swing of the gearshift lever 120 is restricted.

In addition, the conventional vehicle gearshift lever unit is configured to function as follows. Specifically, when a knob button 127 provided to the gearshift knob 123 is operated, the pull rod 122 is pulled up toward the top end side with the assistance of a link mechanism 130 inside the gearshift knob 123; the rod base end portion is disengaged from the detent mount; and the gearshift lever 120 becomes swingable. Further, when the knob button 127 is pressed down toward a knob main body 126, the link mechanism 130 causes a link body 133 to turn about its pivotally-supported portion O; and causes a link lever 135 to pull up the pull rod 122 by using a connection hole 124 with which the link lever 135 engages.

An almost U-shaped fixation spring 114 is placed on the lateral surface of an engagement cylinder portion 128 extendedly provided in the gearshift knob 123, in a way to traverse the engagement cylinder portion 128. Parts of end portions 114a of the fixation spring 114 pass through to the inside of the engagement cylinder portion 128. Subsequently, when the end of the pull rod 122 is inserted into the engagement cylinder portion 128 of the knob main body 126, the end portions 114a engage with a fixation groove 121b formed in the lateral surface of the gearshift lever 120. Thereby, the gearshift knob 123 is fixed to the gearshift lever 120.

For attaching the gearshift knob 123 to the end of the gearshift lever 120, the end of the pull rod 122 is inserted into the inside of the engagement cylinder portion 128 of the knob main body 126 with the knob button 127 not pressed. Incidentally, while the knob button 127 is not pressed, the end of the link lever 135 is held in a position away from an attachment hole 129 of the pull rod 122 due to a biasing force of a return spring (not illustrated).

Subsequently, the parts of the fixation spring 114 passing through to the inside of the engagement cylinder portion 128 hit step portions 141 formed in the lateral surface on a top end side of the gearshift lever 120. In this hitting state, the knob button 127 is pressed down, and the gearshift lever 120 is further pressed into the engagement cylinder portion 128 with the link lever 135 pressed against the lateral surface of the end of the pull rod 122.

As a result, the fixation spring 114 is forced slightly open, and is thus disengaged from the step portions 141. Accordingly, the gearshift lever 120 is deeply inserted into the engagement cylinder portion 128. During this process, the link lever 135 is inserted into the connection hole 124, and the fixation spring 114 engages with the fixation groove 121b formed in the lateral surface of the gearshift lever 120. Thereby, the gearshift knob 123 is fixed to the gearshift lever 120.

CITATION LIST

Patent Literature

[Patent Literature 1] Japanese Patent Application Laid-Open No. 2005-1470

SUMMARY OF INVENTION

Technical Problems

Nevertheless, the conventional vehicle gearshift lever unit described in Patent Literature 1 requires two steps for assembling the gearshift knob 123 to the gearshift lever 120. In the first step, the end of the pull rod 122 is inserted into the inside of the engagement cylinder portion 128 of the knob main body 126. Then, the insertion is temporarily suspended at such a position that the insertion load becomes heavy as a result of the fixation spring 114 hitting the step portions 141. Then, in the second step, the end of the pull rod 122 is further inserted with the knob button pressed down. In addition, the assembly work for the steps depends on the sensation of the worker. For these reasons, the conventional vehicle gearshift lever unit has a problem that the workability is poor when these steps are performed together with the rest of the assembly work in the vehicle assembly line.

Against this background, the present invention has been made for the purpose of solving the foregoing problem. An object of the present invention is to provide a gearshift knob attaching structure for a vehicle gearshift lever unit which makes it possible to simplify the work process, and thereby to enhance the assembly workability.

Solution to Problems

A first aspect of the present invention is a gearshift knob attaching structure for a vehicle gearshift lever unit, comprising: a cylinder-shaped gearshift lever turnably attached to a housing; an operation member placed inside the gearshift lever in a way to be movable in an axial direction; a gearshift knob placed with an end portion of the gearshift lever inserted in an inner insertion hole of the gearshift knob; a knob button attached to the gearshift knob in a way to be operable to be pressed down; and a link mechanism placed inside the gearshift knob, connecting the knob button and the operation member together, and configured to move the operation member from a base end side to a top end side in the gearshift lever when the knob button is pressed down. The gearshift knob attaching structure is characterized in that a connection hole is provided in an end of the operation member, the connection hole passing through the operation member in a way to intersect the axial direction; the link mechanism includes a link body placed inside the gearshift knob in a way to be turnable with a turning surface thereof turning in the axial direction, a link lever provided on the link body, and placed in a way to be insertable into and removable from the connection hole, and an auxiliary lever placed to be contactable with the end of the operation member, and configured to be turnable along the turning surface of the link body; and when the end portion of the gearshift lever is pressed into the inner insertion hole of the gearshift knob, the link body turns along with the auxiliary lever which turns while in contact with the end of the operation member, and an end of the link lever is inserted into the connection hole.

A second aspect of the present invention is the gearshift knob attaching structure for a vehicle gearshift lever unit according to the first aspect, further including a guidance wall in a wall surface surrounding the connection hole, the guidance wall provided at a base end side of the connection hole, and characterized in that: in the process of inserting an end portion of the gearshift lever into the inner insertion hole of the gearshift knob, the link lever is guided by the guidance wall to a deep portion of the connection hole, the link body turns, and the auxiliary lever is separated from the end of the operation member; and in a state where the gearshift knob is attached to a predetermined position of an upper end of the gearshift lever, the auxiliary lever is separated from the end of the operation member.

A third aspect of the present invention is the gearshift knob attaching structure for a vehicle gearshift lever unit according to the first or second aspect, characterized in that the link lever and the auxiliary lever are integrally formed on the link body.

A fourth aspect of the present invention is the gearshift knob attaching structure for a vehicle gearshift lever unit according to the third aspect, characterized in that the auxiliary lever is provided on the link body in a way to have a turn range including a straight line passing a center of turn of the link body and being orthogonal to the axial direction; and the link lever is placed on the link body in a way to have a turn range located closer to the base end than the turn range of the auxiliary lever is.

A fifth aspect of the present invention is the gearshift knob attaching structure for a vehicle gearshift lever unit according to any one of the first to fourth aspects, characterized in that the end of the operation member is set in a way to have an end surface oblique to the axial direction in a manner that an edge portion of the end surface at the top end side is closer to an end of the auxiliary lever than an edge portion of the end surface at the base end side is.

A sixth aspect of the present invention is the gearshift knob attaching structure for a vehicle gearshift lever unit according to any one of the third to fifth aspects, characterized in that the end of the auxiliary lever extends in an extension direction toward the end of the operation member and is bent toward the end surface of the end of the operation member.

Advantageous Effects of Invention

In the first aspect of the present invention, the configuration is such that, when the end portion of the gearshift lever is pressed into the inner insertion hole of the gearshift knob, the link body turns along with the auxiliary lever which turns while in contact with the end of the operation member, and an end of the link lever is inserted into the connection hole. Thus, the work process for attaching the gearshift knob to the gearshift lever can be completed in a single step of pressing the end of the gearshift lever into the inner insertion hole of the gearshift knob. Accordingly, the assembly workability can be enhanced.

In the second aspect of the present invention, the configuration is such that, in the process of inserting an end portion of the gearshift lever into the inner insertion hole of the gearshift knob, the link lever is guided by the guidance wall to a deep portion of the connection hole, the link body turns, and the auxiliary lever is separated from the end of the operation member. Thus, while the operation member is moved upward and downward by press-operating the knob button, the operation member can be securely operated by the link lever with no influence from the auxiliary lever.

In the third aspect of the present invention, the link lever and the auxiliary lever are integrally formed on the link body. Thus, the assembly workability can be enhanced without increasing the number of component parts.

In the fourth aspect of the present invention, the auxiliary lever is provided on the link body in a way to have a turn range including a straight line passing a center of turn of the link body and being orthogonal to the axial direction; and the link lever is placed on the link body in a way to have a turn range located closer to the base end than the turn range of the auxiliary lever is. Thereby, the turn range of the end of the auxiliary-lever, which is projected onto the axial line of the operation member, is made larger than the turn range of the end of the link-lever, which is projected onto the axial line of the operation member. Accordingly, when the link body turns and the link lever moves the operation member in the axial direction, the distance the auxiliary lever moves in the axial direction is larger than the distance the operation member moves. For this reason, when the knob button is pressed down, the end of the auxiliary lever is separated from the end of the operation member. As a consequence, the press-operation of the knob button is no longer hampered by the auxiliary lever.

In the fifth aspect of the present invention, the end of the operation member is set in a way to have an end surface oblique to the axial direction in a manner that an edge portion of the end surface at the top end side is closer to an end of the auxiliary lever than an edge portion of the end surface at the base end side is. Thereby, the end of the auxiliary lever is capable of separating from the end surface of the operation member more securely when the link body turns.

In the sixth aspect of the present invention, the end of the auxiliary lever extends in an extension direction toward the end of the operation member and is bent toward the end surface of the end of the operation member. Thereby, the end of the auxiliary lever is capable of separating from the end surface of the operation member more securely when the link body turns.

BRIEF DESCRIPTION OF DRAWINGS

FIG. 9 is a cross-sectional view obtained in the same manner as FIG. 5, and shows that a knob button of the gearshift knob is pressed down in the embodiment of the present invention.

DESCRIPTION OF EMBODIMENT

Descriptions will be hereinbelow provided for an embodiment of the present invention on the basis of the drawings.

Figure 1:
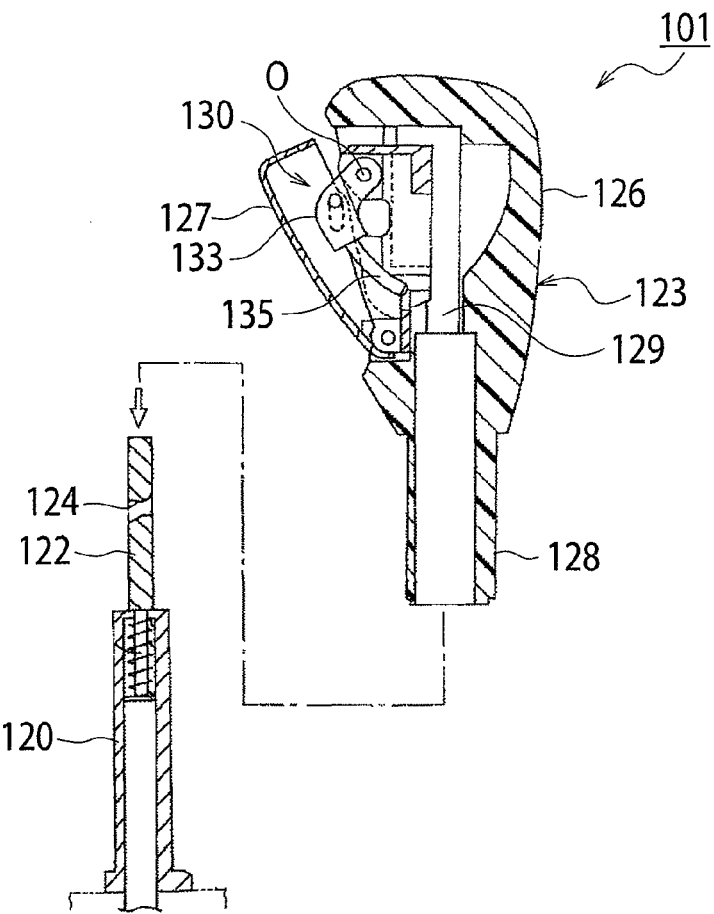
FIG. 1 is a main part cross-sectional view showing a conventional gearshift lever unit.
Figure 2:
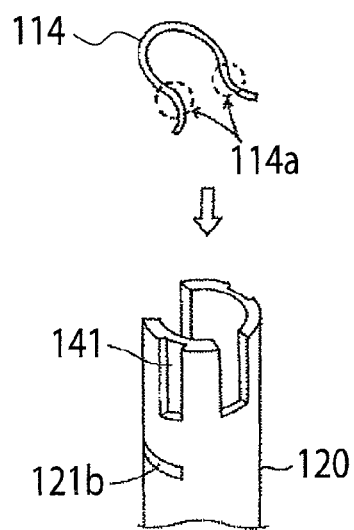
FIG. 2 is a main part magnified perspective view showing the conventional gearshift lever unit.
Figure 3:
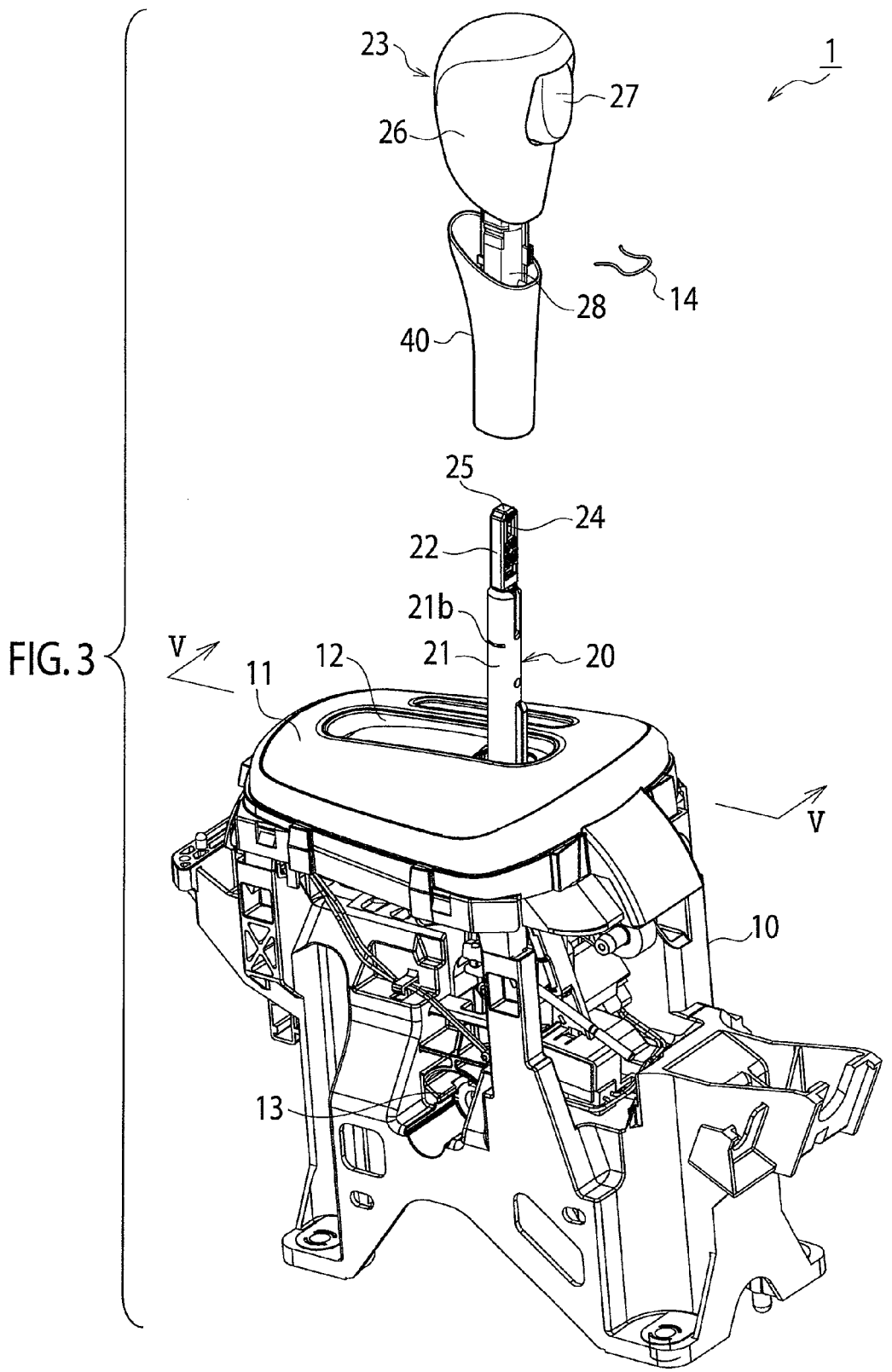
FIG. 3 shows an embodiment of the present invention, and is an exploded perspective view of a gearshift lever unit of an automatic transmission.
Figure 4:
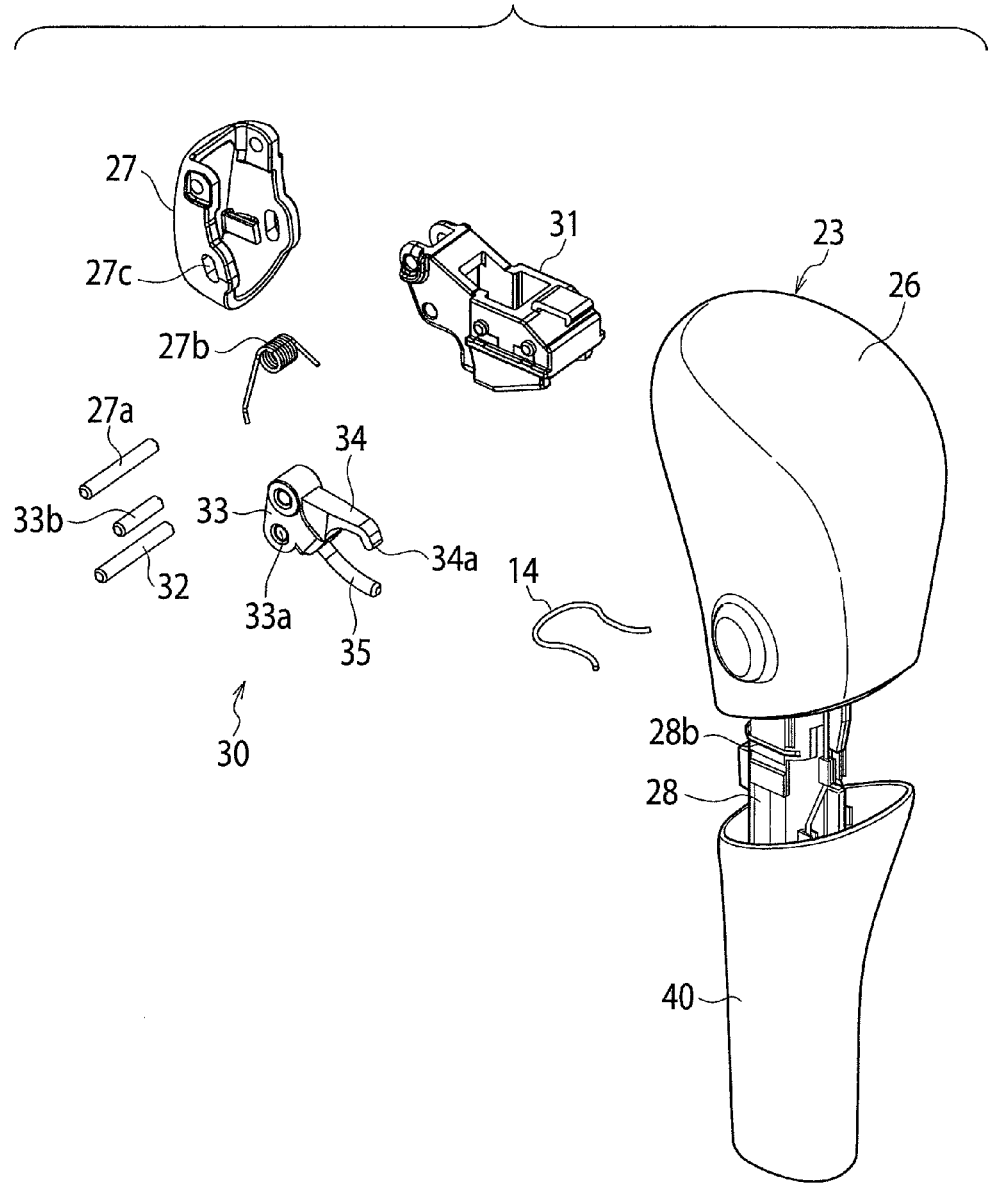
FIG. 4 shows the embodiment of the present invention, and is an exploded perspective view of a gearshift knob.

As shown in FIG. 3, a gearshift lever unit 1 includes: a housing 10 fixed to a vehicle body; and a gearshift lever 20 whose portion closer to a base end B is turnably supported by the housing 10. In addition, a selector cover 11 is attached to the front surface of the housing 10. The gearshift lever 20 is inserted in the selector cover 11. The selector cover 11 is provided with a selector hole 12 formed from an elongated hole extending in the same direction as the gearshift lever 20 turns.

The gearshift lever 20 includes: a cylinder-shaped lever main body 21; a pull rod (an operation member) 22 placed in the cylinder of the lever main body 21; and a gearshift knob 23 placed in the end of the lever main body 21.

The lever main body 21 has a base 21a in its base end-side portion. The base 21a is pivotally supported by a pivotally-supporting portion 13 of the housing 10. Accordingly, the lever main body 21 is turnably placed there.

The pull rod 22 is placed movable in its axial direction L while penetrating the inside of the cylinder of the lever main body 21. In addition, the pull rod 22 has a detent engagement portion (not illustrated) in its base end-side end portion. The pull rod 22 has a constitution in which: when the pull rod 22 moves in its axial direction, a detent portion (not illustrated) provided in the housing 10 and the detent engagement portion engage with, or disengage from, each other; and thereby, the position and movement of the gearshift lever 20 is controlled. A top end-side end portion of the pull rod 22 is provided with a connection hole 24 passing through the pull rod 22 in a direction intersecting the axial direction L and being open in the lateral surface of the pull rod 22. Incidentally, the pull rod 22 is held and biased by a biasing spring (not illustrated) toward the base end B, that is to say, in a direction in which the engagement between the detent engagement portion and the detent portion is held.

The connection hole 24 is opened in a substantially rectangular shape when viewed from the front of the hole. A wall surface surrounding the connection hole 24 includes a guidance wall 24a on its base end B side, and a connection wall 24b on its top end T side. The guidance wall 24a is set as a slope surface which slopes in a way that: its hole entrance 24 in is closest to the base end B; and its hole exit 24 out is closest to the top end T side. The connection wall 24b is shaped like a mountain whose center portion projects toward the base end.

An end surface 25 of the pull rod 22 at a top end T side is set as a slope surface oblique to the axial direction L. In addition, the end surface 25 is set to face the upper left in FIG. 5 in a way that: an edge portion 25a of the end surface 25, which is closer to the front end T, is situated in an entrance-side lateral surface of the pull rod 22 to which the hole entrance 24 in is opened; and an edge portion 25b of the end surface 25, which is closer to the base end B, is situated in an exit-side lateral surface of the pull rod 22 to which the hole exit 24 out is opened.

The gearshift knob 23 includes: a knob button 27 placed in the lateral surface of a knob main body 26; and a link mechanism 30 placed inside the knob main body 26. Both the knob button 27 and the link mechanism 30 are placed there with a frame-shaped link case 31 interposed in between.

The knob main body 26 is shaped almost like a spindle, and has a cylinder-shaped lock cylinder portion 28 on the base end B side of the main body portion 26a. The lock cylinder portion 28 includes an inner insertion hole 28a in which a top end-side portion of the gearshift lever 20 can be inserted. In addition, a case accommodation chamber 29 to accommodate the link case 31 therein is formed in the lateral surface of the knob main body 26. The knob button 27 and the link mechanism 30, which will be described later, are installed in the link case 31.

A top end-side edge portion of the knob button 27 is swingably pivotally supported by a button pin 27a. The knob button 27 is biased by a repulsive force of a return spring 27b held between the link case 31 and the knob button 27, in a direction to project outward from the case accommodation chamber 29. The knob button 27 is configured in a way that its press operation can be achieved by pressing the base end-side portion of the knob button 27 inward.

A center portion of a connection pin 32 is fittingly inserted in a round hole 32a provided in a link body 33, while the two end portions of the connection pin 32 is slidably inserted in long hole portions 27c formed in the lateral surfaces of the knob button 27, respectively. Thus, the knob button 27 and the link body 33 are linked together with the connection pin 32.

The link body 33 is placed inside the link case 31 in a way to be turnable (swingable) about a link body pin 33b, and in a further way to be turnable with a turning surface of the link body 33 turning along the axial direction. In addition, the link body 33 integrally includes an auxiliary lever 34 and a link lever 35.

Figure 8:
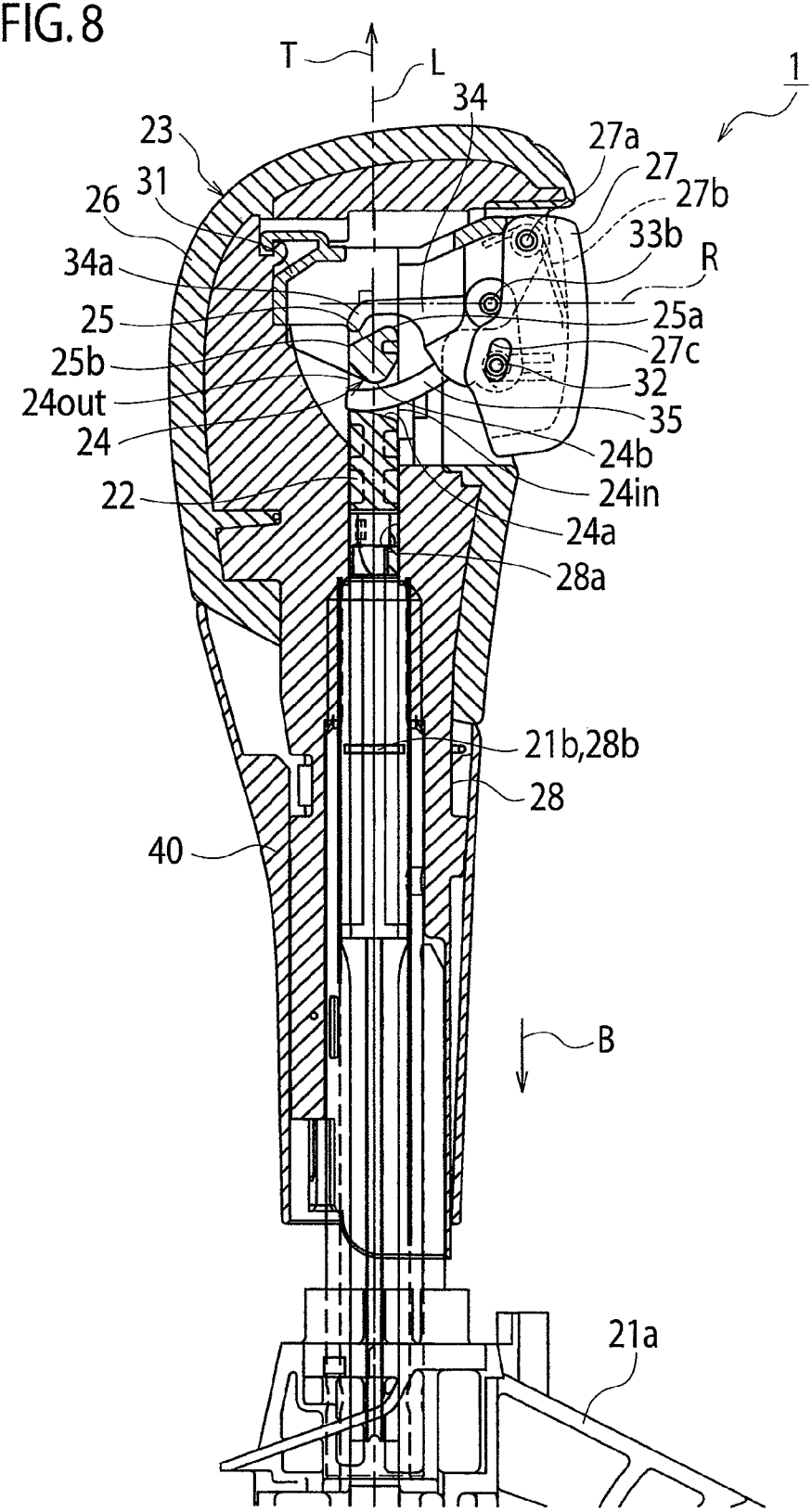
FIG. 8 is a cross-sectional view obtained in the same manner as FIG. 5, and shows that the attachment of the gearshift knob is completed in the embodiment of the present invention.

The auxiliary lever 34 is placed on the link body 33 in a way to have a turn range including a straight line R passing the link body pin 33b, which is the center of turn of the link body 33, and being orthogonal to the axial direction L. The auxiliary lever 34 is configured to be turnable along the turning surface of the link body 33. In other words, in an initial condition of its operation, the auxiliary lever 34 is formed on the link body 33 to extend horizontally at right angles to the pull rod 22 placed in the vertical direction in FIG. 8. In addition, an end 34a of the auxiliary lever 34 is in the shape of a hook which extends in a direction toward the end of the pull rod 22 (downward in FIG. 5) and then is bent toward the end surface 25 of the pull rod 22 (upward in FIG. 5).

The link lever 35 is placed on the link body in a way to have a turn range located closer to the base end B than a turn range of the auxiliary lever 34 is. In other words, the link lever 35 is formed on the link body 33 to extend obliquely downward in FIG. 8, in the initial condition of the operation. Moreover, the link lever 35 is formed in an arc shape curved toward the top end side. Thereby, the link lever 35 is inserted in the connection hole 24, and is set to be prevented from being caught by the connection wall 24b of the connection hole 24 when the pull rod 22 is pulled up; and from abruptly changing load applied to the link lever 35 during its operation.

Next, descriptions will be provided for a sequence of attaching the gearshift knob 23 to the end of the gearshift lever 20. First, as a preparation for attaching the gearshift knob 23, the housing 10 is fixed to the vehicle body (not illustrated) with the gearshift lever 20, in whose cylinder the pull rod 22 is placed, pivotally supported by the housing 10. Subsequently, the selector cover 11 is fixed to the housing 10, and a cover member (not illustrated) and something similar, which are configured to cover and hide the gearshift lever unit 1 and its vicinity are attached to the vehicle body. Additionally, the gearshift lever 20 is inserted into the selector hole 12 of the selector cover 11, and thereafter, the knob cover 40 and the gearshift knob 23 are assembled to the gearshift lever 20.

Figure 5:
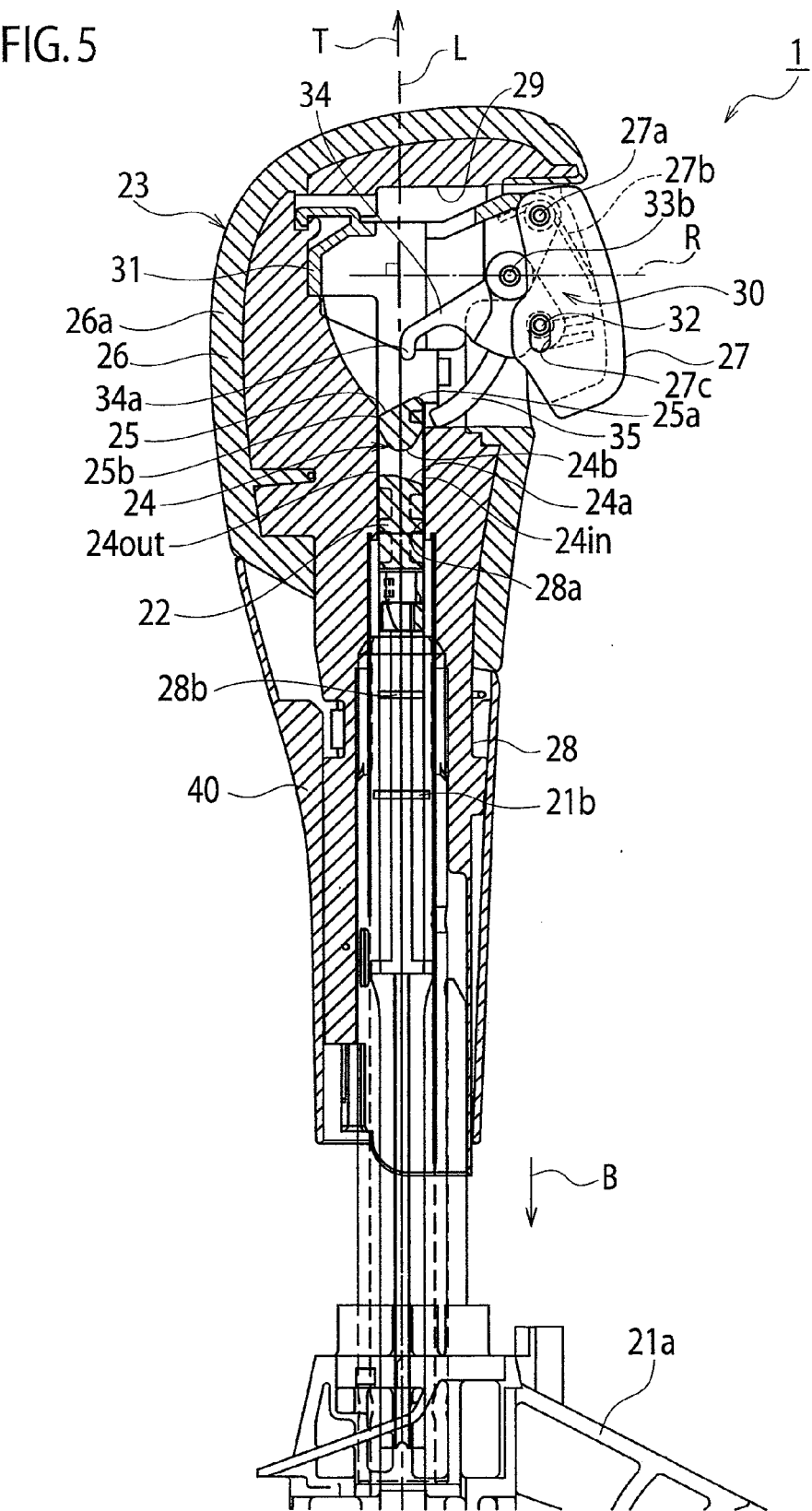
FIG. 5 shows the embodiment of the present invention, and is a cross-sectional view of the gearshift lever unit taken along the V-V line of FIG. 3 which shows an initial state of attaching the gearshift knob to a gearshift lever.

In addition, with regard to the gearshift knob 23, the knob button 27 and the link body 33 are assembled to the link case 31, and the resultant link case 31 is fitted into the case accommodation chamber 29. During this work, although the knob button 27 is biased by the repulsive force of the return spring 27b in a direction in which the knob button 27 turns counterclockwise in FIG. 5, the link lever 35 is brought into contact with the lower surface of the case accommodation chamber 29, and further turning is stopped. This position is the assemble position. As shown in FIG. 5, the end of the link lever 35 is situated in a position shifted from the extension of the insertion hole 28a. In addition, the end 34a of the auxiliary lever 34 is placed on the extension of the inner insertion hole 28a.

Figure 6:
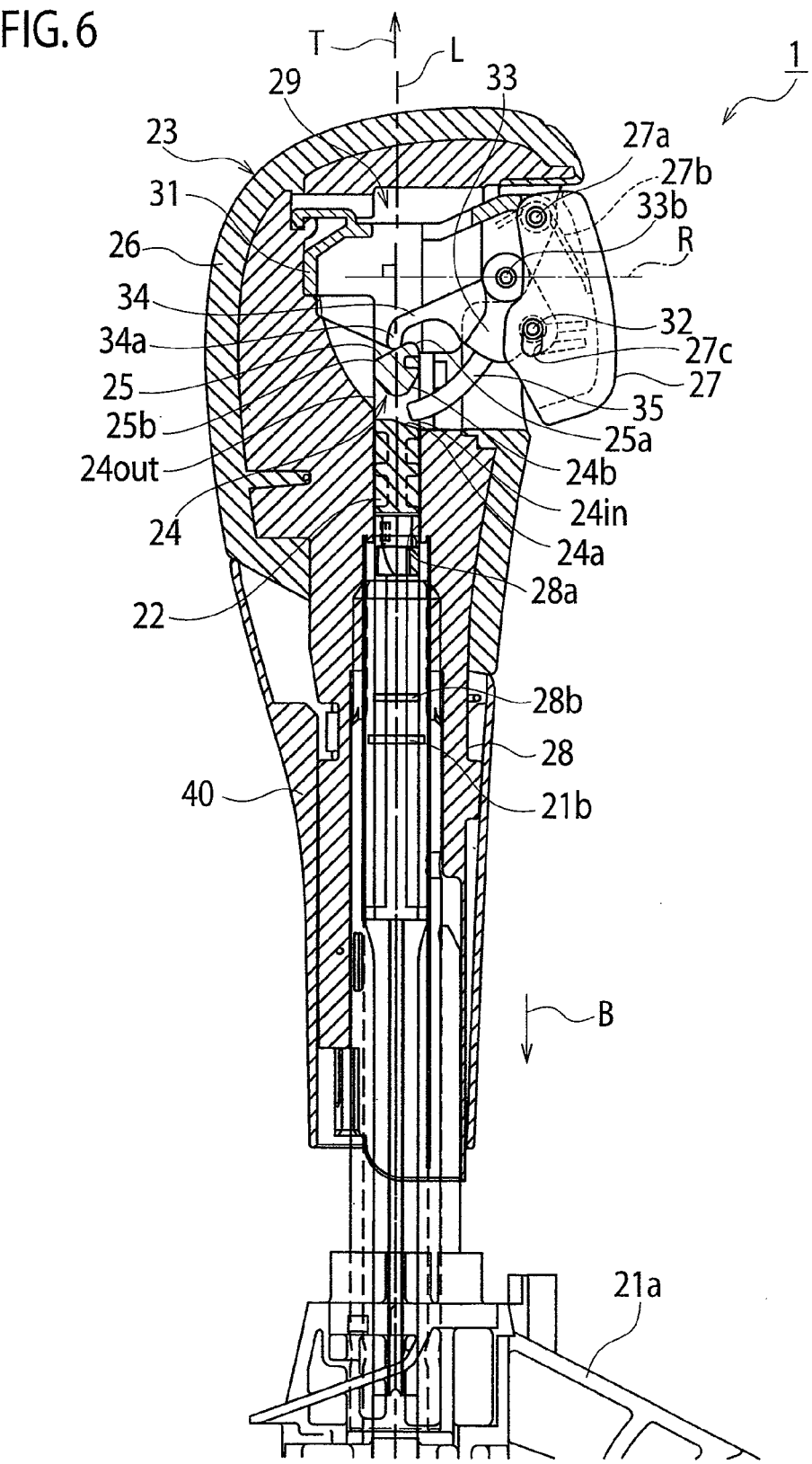
FIG. 6 is a cross-sectional view obtained in the same manner as FIG. 5, and shows that link body starts to turn after an auxiliary lever is brought into contact with an end surface of a pull rod in the embodiment of the present invention.
Figure 7:
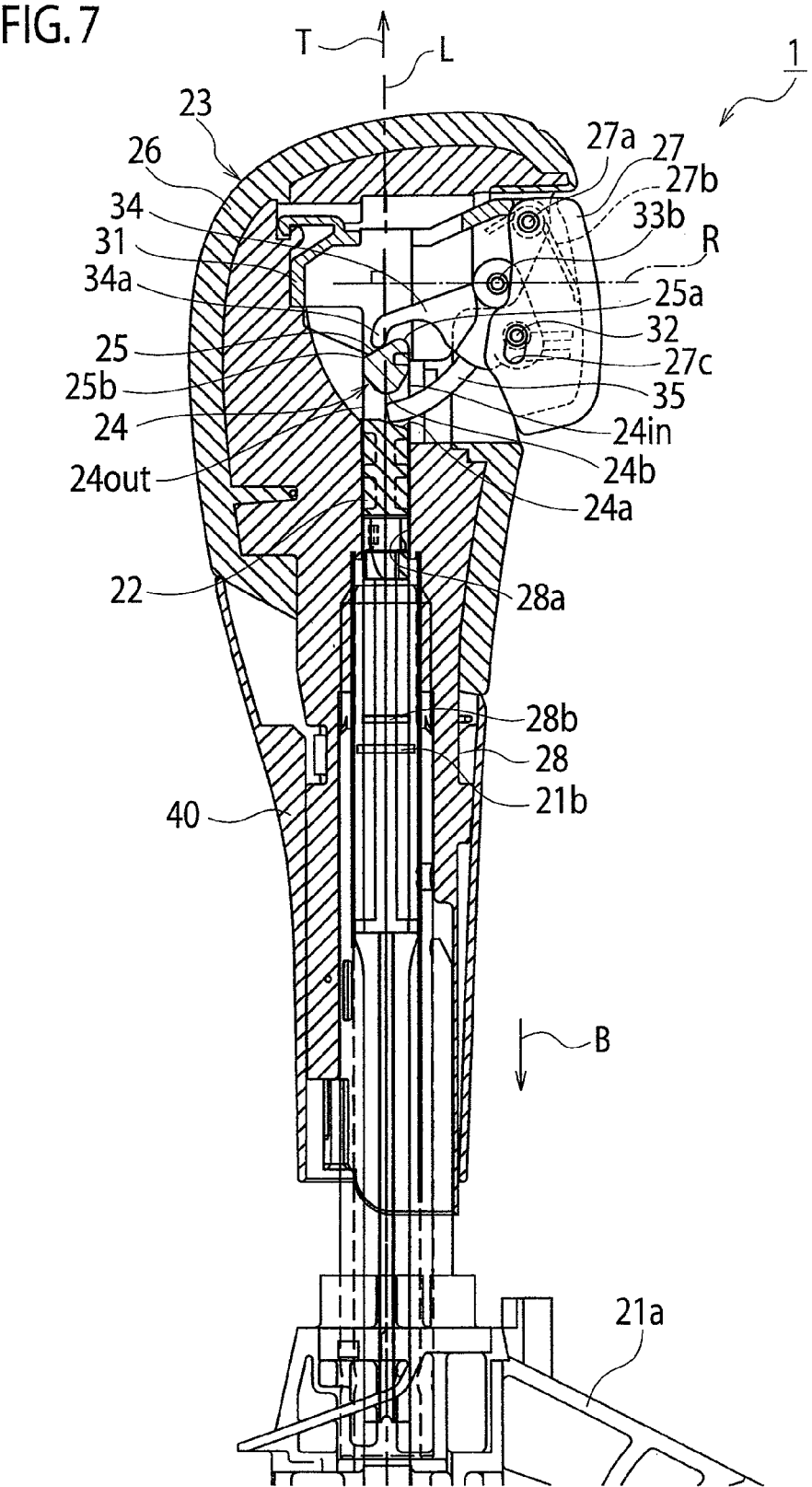
FIG. 7 is a cross-sectional view obtained in the same manner as FIG. 5, and shows that the link body further turns after a link lever is brought into contact with a guidance wall of a connection hole in the embodiment of the present invention.

The gearshift knob 23 is assembled to the gearshift lever 20 as follows. First, the end portion of the gearshift lever 20 is inserted into the inner insertion hole 28a of the gearshift knob 23 while adjusting the direction of the gearshift knob 23 in a way that, as shown in FIG. 5, the knob button 27 is positioned to the entrance-side lateral surface in which the hole entrance 24 in of the connection hole 24 is opened. When, as shown in FIG. 6, the end of the pull rod 22 comes into contact with the end of the auxiliary lever 34 inside the gearshift knob 23, the gearshift knob 23 is further pressed down. Thereby, the link body 33 turns clockwise in the drawing. Accordingly, as shown in FIG. 7, the link lever 35 is inserted into the connection hole 24.

By further continuingly pressing down the gearshift knob 23, the link body 33 continues turning clockwise in the drawing, and the link lever 35 is guided by the guidance wall 24a of the connection hole 24, thus being pulled deeply into the connection hole 24. Hence, the link body 33 is caused to turn clockwise in the drawing more than the gearshift knob 23 is pressed down, and the auxiliary lever 34 is separated away from the end of the pull rod 22. Once the gearshift knob 23 is pressed down to a predetermined position, a fixation groove 21b formed in the lever main body 21 and a lock hole 28b formed in the lock cylinder portion 28 of the gearshift knob 23 overlap each other. For this reason, a fixation spring 14 beforehand put in the lock hole 28b engages with the fixation groove 21b. Accordingly, the gearshift knob 23 is engaged with and fixed to the gearshift lever 20 by use of the fixation spring 14. Incidentally, the knob cover 40 is beforehand locked to the lock cylinder portion 28 to cover and hide the lock cylinder portion 28, before attachment to the gearshift lever 20.

Once the knob button 27 is pressed down, the foregoing configuration causes the knob button 27 to turn about the button pin 27a, thus moves the connection pin 32 while sliding the connection pin 32 in the long hole portions 27c in the respective lateral surfaces of the knob button 27, and thereby makes the link body 33 turn clockwise in the drawing. The clockwise turn of the link body 33 in the drawing causes the link lever 35 inserted in the connection hole 24 to pull up the pull rod 22 toward the top end T side, thus separates the detent engagement portion from the detent portion, and thus releases the gearshift lever 20 from the movement restriction. In addition, when the knob button 27 is pressed down, the clockwise turn of the link body 33 in the drawing makes the distance the pull rod 22 is pulled up larger than the distance the auxiliary-lever end 34a is separated from the pull-rod end surface 25. For this reason, when the knob button 27 is pressed down, the auxiliary lever 34 is always kept separated from the pull-rod end surface 25. Once the knob button 27 is stopped from being pressed down, the knob button 27 is returned by the return spring 27b to its initial position of the operation, and the link body 33 returns to its initial position of the operation while turning counterclockwise in the drawing. Furthermore, the pull rod 22 is returned to the position in which the biasing spring makes the detent engagement portion and the detent portion engage with each other.

As described above, this embodiment described above adopts the configuration in which, when the end portion of the gearshift lever is pressed into the inner insertion hole of the gearshift knob, the auxiliary lever is brought into contact with the pull-rod end, the link body thus turns, and the link-lever end is accordingly inserted into the connection hole. Thereby, the working process of attaching the gearshift knob to the gearshift lever can be completed by the single step of pressing the end of the gearshift lever into the inner insertion hole of the gearshift knob. For this reason, this embodiment can improve the assembly workability, and can prevent the occurrence of unsatisfactory conditions such as breakage of a component part due to failure in following the assembly sequence.

Furthermore, this embodiment adopts the configuration in which, when the end portion of the gearshift lever is pressed into the inner insertion hole of the gearshift knob, the link lever is guided by the guidance wall into a deep portion of the connection hole, the link body turns, and the auxiliary lever is separated from the pull-rod end. Thereby, when the pull rod is moved upward and downward by press-operating the knob button, the pull rod can be securely operated by the link lever with no influence from the auxiliary lever.

Moreover, because the link lever and the auxiliary lever are integrally formed on the link body, the assembly workability can be enhanced while preventing increase in manufacturing costs without increasing the number of component parts.

The auxiliary lever is placed on the link body in a way that to have the turn range including the straight line passing the center of turn of the link body, and being orthogonal to the axial direction. The link lever is placed on the link body in a way to have the turn range located closer to the base end than the turn range of the auxiliary lever is. Thereby, the turn range of the end of the auxiliary-lever, which is projected onto the axial line of the pull rod, is made larger than the turn range of the end of the link-lever, which is projected onto the axial line of the pull rod. Accordingly, when the link body turns and the link lever moves the pull rod in the axial direction, the distance the auxiliary lever moves in the axial direction is larger than the distance the pull rod moves. For this reason, when the knob button is pressed down, the end of the auxiliary lever is relatively separated from the end of the pull rod. As a consequence, the press-operation of the knob button is no longer hampered by the auxiliary lever.

The end surface of the pull-rod end is set to be oblique to the axial direction, and has its top end-side edge portion set to be closer to the end of the auxiliary lever than its base end-side edge portion is. Thereby, the end of the auxiliary lever is capable of separating from the end surface of the pull rod more securely when the link body turns.

Since the end of the auxiliary lever extends in an extension direction toward the end of the pull rod and then is bent toward the end surface of the pull-rod, the end of the auxiliary lever is capable of being separated from the pull-rod top end surface more securely when the link body turns.

It should be noted that, although the auxiliary lever and the link lever are integrally provided to the link body in this embodiment, the auxiliary lever and the link lever may be provided as bodies independent of the link body as long as the levers have a structure in which the levers interlock together, or the auxiliary lever may be integrally provided to the knob button.

The entire contents of Japanese Patent Application No. 2010-148987 (filed on Jun. 30, 2010) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A gearshift knob attaching structure for a vehicle gearshift lever unit, comprising:
    a cylinder-shaped gearshift lever turnably attached to a housing;
    an operation member placed inside the gearshift lever in a way to be movable in an axial direction;
    a gearshift knob placed with an end portion of the gearshift lever inserted in an inner insertion hole of the gearshift knob;
    a knob button attached to the gearshift knob in a way to be operable to be pressed down; and
    a link mechanism placed inside the gearshift knob, connecting the knob button and the operation member together, and configured to move the operation member from a base end side to a top end side in the gearshift lever when the knob button is pressed down, wherein
    a connection hole is provided in an end of the operation member, the connection hole passing through the operation member in a way to intersect the axial direction;
    the link mechanism comprises:
        a link body placed inside the gearshift knob in a way to be turnable with a turning surface thereof turning along the axial direction;
        a link lever provided on the link body, and placed in a way to be insertable into and removable from the connection hole; and
        an auxiliary lever placed to be contactable with the end of the operation member, and configured to be turnable along the turning surface of the link body; and
    when the end portion of the gearshift lever is pressed into the inner insertion hole of the gearshift knob, the link body turns along with the auxiliary lever which turns while in contact with the end of the operation member, and an end of the link lever is inserted into the connection hole.

2. The gearshift knob attaching structure for a vehicle gearshift lever unit according to claim 1, further comprising:
    a guidance wall in a wall surface surrounding the connection hole, the guidance wall provided at a base end side of the connection hole, wherein
    in the process of inserting an end portion of the gearshift lever into the inner insertion hole of the gearshift knob, the link lever is guided by the guidance wall to a deep portion of the connection hole, the link body turns, and the auxiliary lever is separated from the end of the operation member; and
    in a state where the gearshift knob is attached to a predetermined position of an upper end of the gearshift lever, the auxiliary lever is separated from the end of the operation member.

3. The gearshift knob attaching structure for a vehicle gearshift lever unit according to claim 2, wherein
    the link lever and the auxiliary lever are integrally formed on the link body.

4. The gearshift knob attaching structure for a vehicle gearshift lever unit according to claim 3, wherein
    the auxiliary lever is provided on the link body in a way to have a turn range including a straight line passing a center of turn of the link body and being orthogonal to the axial direction; and
    the link lever is placed on the link body in a way to have a turn range located closer to the base end than the turn range of the auxiliary lever is.

5. The gearshift knob attaching structure for a vehicle gearshift lever unit according to any one of claim 4, wherein
    the end of the operation member is set in a way to have an end surface oblique to the axial direction in a manner that an edge portion of the end surface at the top end side is closer to an end of the auxiliary lever than an edge portion of the end surface at the base end side is.

6. The gearshift knob attaching structure for a vehicle gearshift lever unit according to any one of claim 5, wherein
    the end of the auxiliary lever extends in an extension direction toward the end of the operation member and is bent toward the end surface of the end of the operation member.

* * * * *